Nov. 5, 1929.  E. S. KANT  1,734,857
SHOCK ABSORBER
Filed June 28, 1927  2 Sheets-Sheet 1
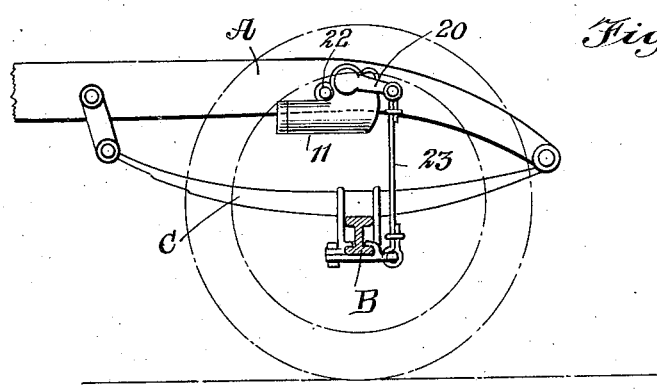
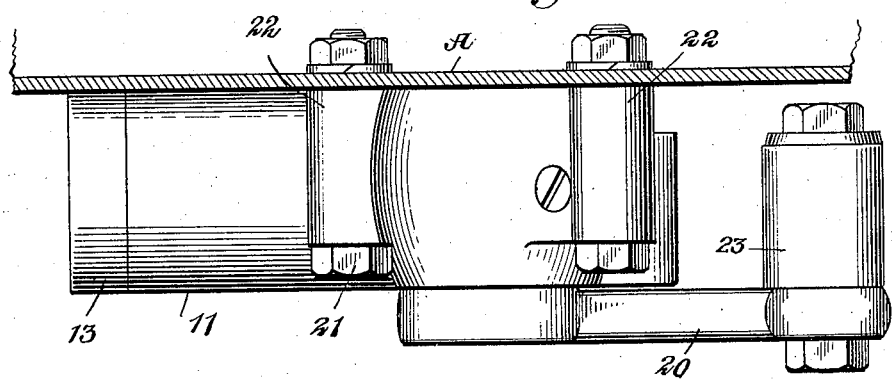
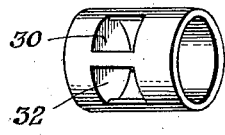
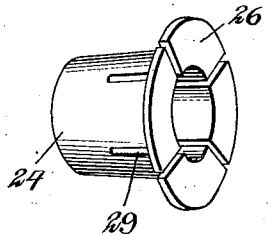
WITNESSES
INVENTOR
Edwin S. Kant
BY
ATTORNEYS Nov. 5, 1929.  E. S. KANT  1,734,857
SHOCK ABSORBER
Filed June 28, 1927   2 Sheets-Sheet 2

INVENTOR
Edwin S. Kant
BY
ATTORNEYS

WITNESSES

Patented Nov. 5, 1929

1,734,857

UNITED STATES PATENT OFFICE

EDWIN SUTHERLAND KANT, OF BROOKLINE, MASSACHUSETTS

SHOCK ABSORBER

Application filed June 28, 1927. Serial No. 202,100.

This invention relates to shock absorbers which while not exclusively designed for such use, are particularly adapted as a means for controlling the recoil force of motor vehicle suspension springs which are interposed between the chassis and axles thereof.

It is a well-established fact that the recoil force of a motor vehicle spring is approximately equal to the force which deflected the same and while the initial deflection is controlled due to the gradual increase in the resistance of the spring, the recoil unless controlled imparts undesirable shocks and vibrations to the vehicle and the occupants thereof. Further, in view of the fact that the recoil force proportionately varies with the variation of the deflection, it is obvious that an ideal shock absorbing device should compensate for the variation in the recoil force. To this end, the present invention comprehends a shock absorber which is so constructed as to compensate for the variation in the recoil force.

More specifically the invention comprehends a shock absorbing device of the character specified, which includes a closed chamber containing a fluid, preferably a liquid, such as oil, and having a cylindrical portion in which a piston is movable in one direction by a spring and in the opposite direction by a suitable cam arm which is actuated by the relative movement of the chassis and axle under the recoil force of the vehicle suspension spring, the piston having passages or by-passes controlled by an automatically adjustable compensating valve, which valve increases and decreases the resistance offered by the device proportionally with the increase or decrease in the recoil force.

Other objects of the invention reside in the comparative simplicity of construction and mode of operation of the device, the economy with which the same may be produced and installed, and the general efficiency derived therefrom.

With the above recited and other objects in view, reference is had to the following description and accompanying drawings in which there is exhibited one example or embodiment of the invention, while the appended claims define the actual scope of the invention.

In the drawings—

Figure 1 is a side view of a shock absorbing device constructed in accordance with the invention in applied position;

Fig. 2 is a plan view thereof;

Fig. 3 is a detail perspective view of one of the compensating valve elements;

Fig. 4 is a similar view of another of the compensating valve elements;

Figure 5:
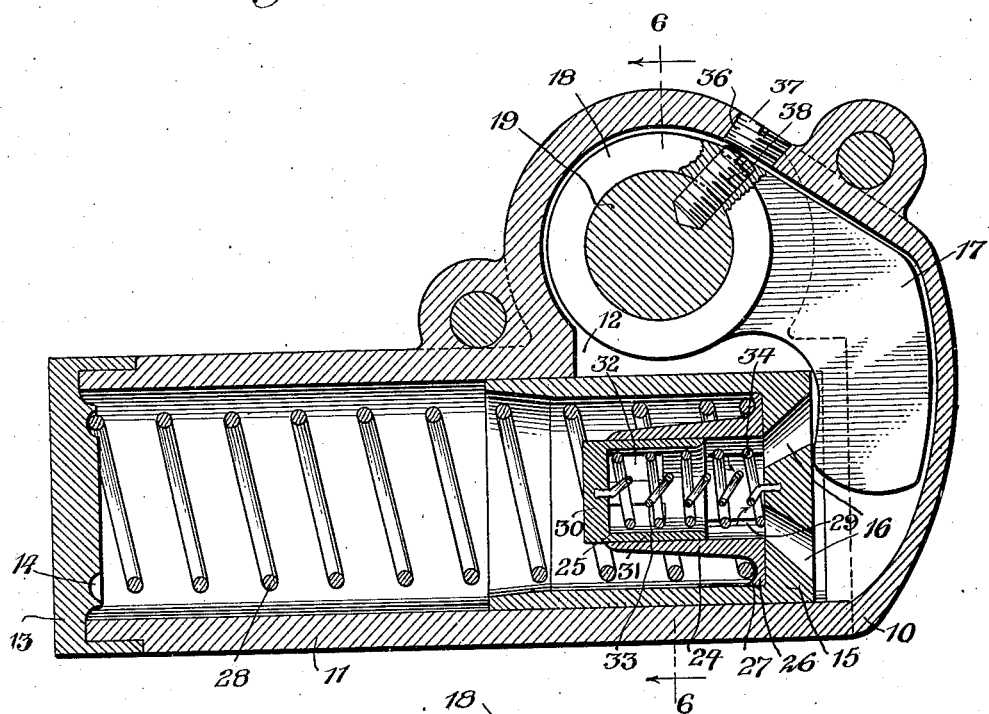
Fig. 5 is a longitudinal sectional view through the device.
Figure 6:
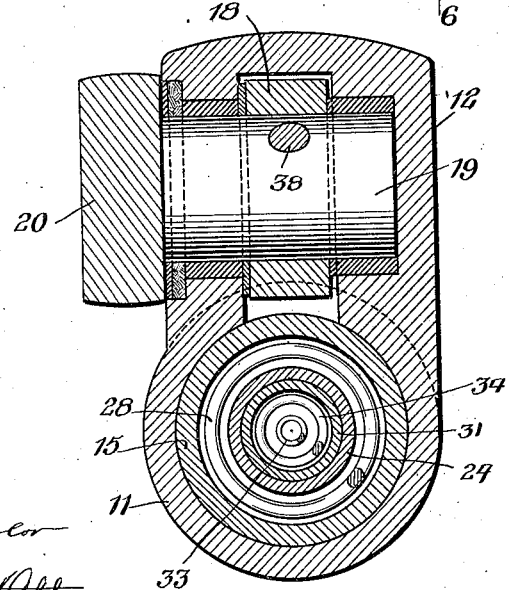
Fig. 6 is a transverse sectional view therethrough taken approximately on the line 6—6 of Fig. 5.

Referring to the drawings by characters of reference, 10 designates the body of the device which is formed with a cylindrical section 11 which communicates at one end with a cam housing section 12. The opposite end is closed by a cap 13, the inner face of which is provided with an annular groove 14 constituting a spring seat. A piston 15 having a head and a cylindrical apron is mounted for axial movement within the cylindrical section 11, the apron extending from the head of the piston 15 in the direction of the cap 13. The piston head is provided with passages or ports 16 establishing communication between the interior of the cylinder 11 and the cam housing section 12. The cam arm 17 engages the outer end of the piston head and said cam arm is carried by a sleeve or hub 18 which is keyed to a transverse shaft 19 journaled in the cam housing section 12. The shaft 19 extends laterally through one side of the cam housing and is provided with a crank arm 20 for effecting rotatory movement of the shaft 19. The body 10 of the device is adapted to be rigidly connected in any suitable manner with the chassis frame A of a motor vehicle, such as by bolts 21 passing through apertured ears 22, while the free end of the crank arm 20 is connected by a flexible connection, such as a strap 23, with the axle B of the motor vehicle.

Within the piston a compensating valve structure is arranged, which consists of a tubular, sleeve-like or cylindrical section 24 and a cup-shaped section 25 telescopically fitted in the section 24. The section 24 is provided at one end with an annular outwardly projecting flange 26 of substantially the same diameter as the internal diameter of the piston apron. The outer face of said flange is adapted to snugly fit against the inner face of the piston head while the inner face of said flange is provided with an annular concentric groove 27 constituting a spring seat. A coiled expansion spring 28 has its opposite end convolutions respectively seated in the grooves or spring seats 14 and 27 of the cap 13 and flange 26, respectively. In addition to exerting a tension to normally project the piston toward the cam housing section 12 so that the outer surface of the piston head engages the cam arm 17, the said spring also serves to retain the valve section 24 in associated relation with the piston. The valve section 24 and its flange 26 are provided with circumferentially spaced radial slits 29 extending inwardly from the flanged end and terminating substantially intermediate of the ends. The valve section 25 is provided with a closed head 30 and a cylindrical wall 31, said flange 31 being formed with circumferentially spaced radial openings or ports 32 adjacent the headed end. A coiled contractile spring 33 has its opposite ends respectively connected to the piston head 15 and the valve section head 30, and a coiled expansion spring 34 of greater tension than the spring 33 is interposed between the piston head 15 and the valve section head 30.

In use and operation, the interior of the body 10 of the device is filled with fluid, preferably oil, which is introduced in any desired manner, but as illustrated, said introduction is accomplished through a filling opening 36 closed by a closure plug 37 which may also be employed for inserting and removing the screw key 38, which keys the cam arm hub 18 to the shaft 19. When the spring C which is interposed between the axle B and the chassis frame A of the vehicle, is deflected by downward movement of the chassis with respect to the axle, the spring 28 functions to move the piston toward the cam end of the cylinder 11 while the piston in turn swings the cam arm 17 and rotates the shaft 19 in a contraclockwise direction until said cam arm reaches the limit of its movement, or the downward movement of the chassis is otherwise arrested. The initial movement of the piston under the action of the spring 28 toward the cam housing end of the cylinder 11 causes an increase of pressure in the cam housing end of the body and a decrease of pressure in the cap end of the cylinder 11. The excess pressure in the cam housing end of the body somewhat restrained by the light spring 33, moves the valve section 25 in an opposite direction to the movement of the piston and projects said section 25 partially beyond the end of the valve section 24, thus uncovering the openings or ports 32 and allowing the fluid to flow from the cam end of the body through said ports or openings 32 into the cap end of the cylinder 11. As the motion of the piston slows down and comes to a stop, the pressure on both sides of the piston equalizes and the spring 33 functions to shift the section 25 again into the valve section 24 to close the ports or openings 32.

The spring 34 plays no part in this action and the effect of the slitted portions 29 is negligible. At this point, the device is set to absorb and control the recoil force transmitted to it by means of the connection or strap 23, as the vehicle spring C forces the body and axle apart. The tension of the strap or connection 23 between the crank 20 and axle B, causes the shaft 19 to turn in a clockwise direction, thereby moving the piston 15 through the medium of the cam arm 17 toward the cap end of the body 10. The recoil force of the spring C which tends to project the chassis upwardly is then controlled by the connection 23 with the crank arm 20 due to the fact that upward movement of the chassis with respect to the axle turns the shaft 19 in a clockwise direction. The turning of the shaft 19 in a clockwise direction, causes the cam arm 17 to cam and move the piston toward the cap end 13 of the cylinder 11, thereby creating a comparatively high diminishing fluid pressure in the cap end of the cylinder. This causes the fluid in the cap end of the cylinder 11 to flow through the narrow slitted portions 29 of the valve section 24, thence through the passages or by-passes 16. The high pressure in the cap end of the cylinder exerts a force on the closed end 30 of the valve section 25 causing said section 25 to move inwardly toward the cam end, compressing the spring 34 until the pressure on each side of the closed end 30, is equalized. This reduces the size of the slitted portions or ports 29 proportionate to the recoil force, it being understood that the greater the recoil force, the more necessary it is to retard the same, and the smaller will be the effective area of the slitted portions or ports 29. As the vehicle spring approaches its normal position and the recoil force decreases, the spring 34 acts to move the section 25 outwardly to uncover a greater area of the slitted portions 29 until the complete restoration of the vehicle spring to a normal position occurs. At this point the valve sections will be disposed in a normal position. It will thus be seen that the valve automatically compensates for variations in the recoil force caused by the variation in the vehicle spring deflection. It thus follows that when a strong recoil force is to be controlled, a relatively small passageway is afforded for the by-passing of the oil or other fluid, while when weaker recoil forces are to be controlled

What is claimed is:

1. A shock absorbing device for controlling the recoil force of a deflected spring or the like, including a body filled with a fluid, a piston having a valved by-pass movable in opposite directions within the body, means for normally moving the piston in one direction coincident with the deflection of the spring, and means operable by the recoil force of the spring for moving the piston in the opposite direction, said valve including telescopically associated cylindrical sections respectively provided with ports of relatively different sizes adapted to be varied in area by relative movement of the valve sections to compensate for variation in the recoil force.

2. A shock absorbing device for controlling the recoil force of a deflected spring or the like, including a body filled with a fluid, a piston having a valved by-pass movable in opposite directions within the body, means for normally moving the piston in one direction coincident with the deflection of the spring, means operable by the recoil force of the spring for moving the piston in the opposite direction, said valve including telescopically associated cylindrical sections respectively provided with ports of relatively different sizes adapted to be varied in area by relative movement of the valve sections to compensate for variation in the recoil force, and opposed springs of relatively different tension for actuating the relative telescopic movement of the valve sections.

3. A shock absorbing device for controlling the recoil force of a deflected spring or the like, including a body filled with a fluid, a piston having a valved by-pass movable in opposite directions within the body, means for normally moving the piston in one direction coincident with the deflection of the spring, means operable by the recoil force of the spring for moving the piston in the opposite direction, said valve including telescopically associated cylindrical sections respectively provided with ports of relatively different sizes adapted to be varied in area by relative movement of the valve sections to compensate for variation in the recoil force, and opposed springs of relatively different tension respectively operable by movement of the piston in opposite directions.

4. A shock absorbing device for controlling the recoil force of a deflected spring or the like, including a body filled with a fluid, a piston having a valved by-pass movable in opposite directions within the body, and means for normally moving the piston in one direction coincident with the deflection of the spring, means operable by the recoil force of the spring for moving the piston in the opposite direction, said valve including telescopically associated cylindrical sections respectively provided with ports of relatively different sizes adapted to be varied in area by relative movement of the valve sections to compensate for variation in the recoil force, and opposed springs of relatively different tension respectively rendered active and inactive by movement of the piston in opposite directions.

5. A device for controlling the recoil force of a resilient member, comprising a body defining a chamber filled with a fluid, a piston movable in the body in opposite directions between its ends, said piston having a by-pass, means for normally moving the piston toward one end of the body coincident with the deflection of the resilient member, means operable by the recoil force of said resilient member for moving the piston toward the opposite end of the body, and a valve for controlling the passage of fluid through the by-pass to compensate for variations of the recoil force of said resilient member, said valve including telescopically associated cylindrical sections respectively provided with ports of relatively different sizes adapted to be varied in area by relative movement of the sections.

6. A device for controlling the recoil force of a resilient member, comprising a body defining a chamber filled with a fluid, a piston movable in the body in opposite directions between its ends, said piston having a by-pass, means for normally moving the piston toward one end of the body coincident with the deflection of the resilient member, means operable by the recoil force of said resilient member for moving the piston toward the opposite end of the body, and a valve for controlling the passage of fluid through the by-pass to compensate for variations of the recoil force of said resilient member, said valve including telescopically associated cylindrical sections respectively provided with ports of relatively different sizes adapted to be varied in area by relative movement of the sections, the ports of both sections operable in unison upon movement of the piston in one direction.

7. A shock absorbing device for controlling the recoil force of a deflected spring or the like, including a body filled with a fluid, a piston having a valve by-pass movable in opposite directions within the body, means for normally moving the piston in one direction and co-incident with the deflection of the spring and means operable by the recoil force of the spring for moving the piston in the opposite direction, the valve for controlling said by-pass impinged against the piston and including a tubular section having communication at its inner end with the by-pass and provided with circumferential radial slits at said inner end, a cup shaped section telescopically fitting within the opposite end of the sleeve having circumferentially spaced radial ports adjacent its outer closed end, said ports being of greater size than the slits, a coiled contractile spring respectively secured to the closed end of the cup shaped section and to the piston and a coiled expansion spring of greater tension than the contractile spring interposed between the piston head and the outer closed end of the cup shaped section.

8. In a shock absorbing device of the character set forth including a piston having a by-pass, a valve for controlling the piston by-pass comprising a tubular section fixed to the piston, communicating with the by-pass at one end and projecting axially of the piston, a cup shaped section snugly fitted within the tubular section and axially movable with respect thereto, the said cup shaped section having circumferentially spaced radial ports adjacent the outer closed end and the tubular section having circumferentially spaced radial ports adjacent its inner end of lesser area than the ports of the cup shaped section, and opposed springs of relatively different tension for retracting and projecting the cup shaped section with respect to the tubular section whereby to completely close and open the ports of the cup shaped section or vary the size of said ports and the ports of the tubular section to compensate for variations in the recoil force.

EDWIN SUTHERLAND KANT.